May 24, 1966     C. WOOD ETAL     3,252,319
DEW POINT DEVICE WITH PROPORTIONAL CONTROL CIRCUIT
Filed Jan. 6, 1964
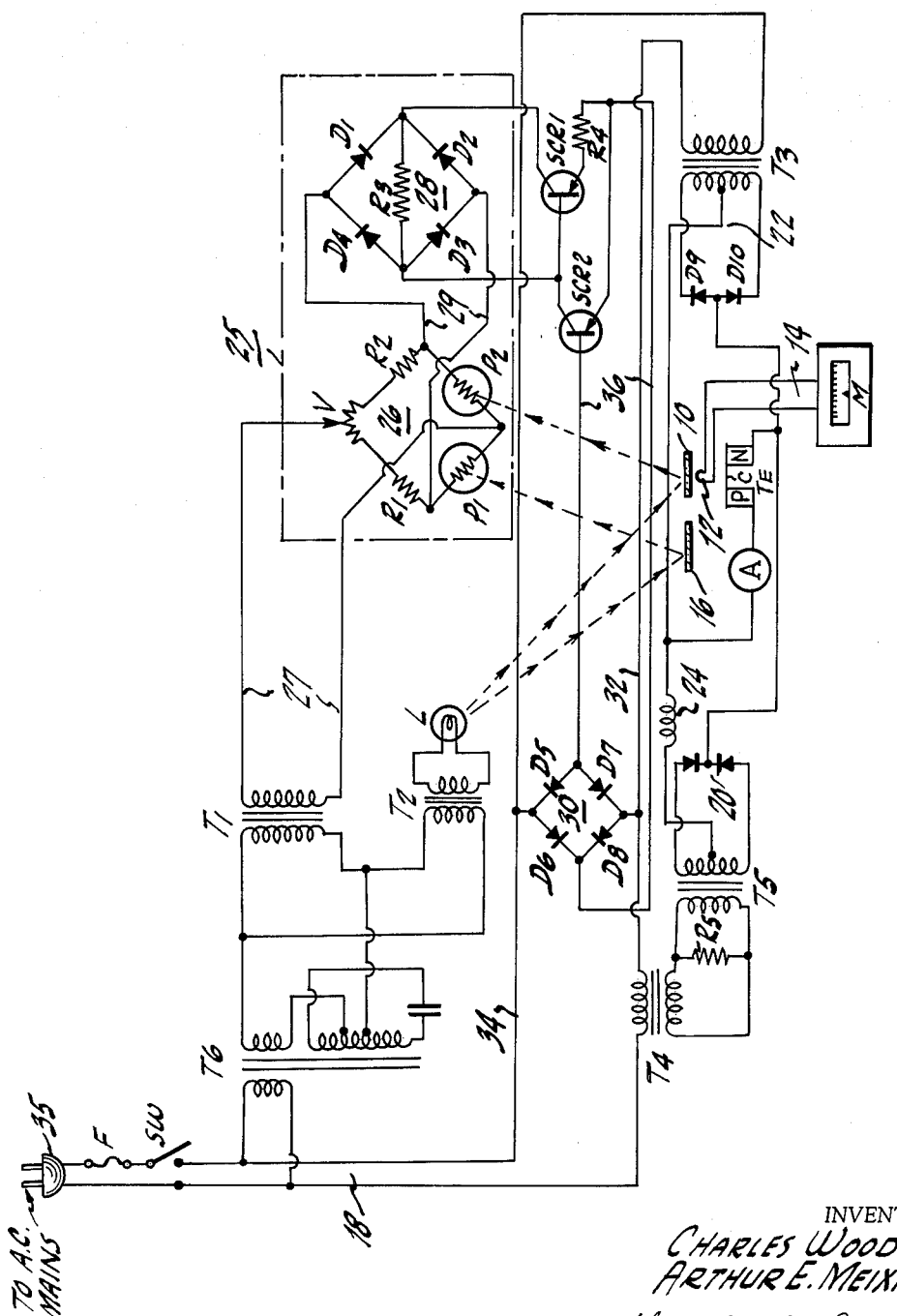
INVENTORS
CHARLES WOOD &
ARTHUR E. MEIXNER
BY Charles H. Brown
ATTORNEY

United States Patent Office 3,252,319
Patented May 24, 1966

3,252,319
DEW POINT DEVICE WITH PROPORTIONAL CONTROL CIRCUIT
Charles Wood, Pittsford, N.Y., and Arthur E. Meixner, Saddle Brook, N.J., assignors to Industrial Instruments, Inc., Cedar Grove, N.J., a corporation of New Jersey
Filed Jan. 6, 1964, Ser. No. 335,861
9 Claims. (Cl. 73—17)

This invention concerns a proportional control circuit for controlling the direction and magnitude of unidirectional current in response to a signal representing a variable of a physical, or electrical nature, such as temperature, humidity, electrolytic conductivity, etc. In the specific embodiment described herein, as an exemplification of the invention, the magnitude and direction of direct current supplied to a thermoelectric module is controlled as a function of a suitable sensor, such as one responsive to the intensity of a light signal from a photoelectric cell.

An object of the invention is to enable the efficient control of the unidirectional current (D.C.) supplied to a thermoelectric module as a function of a signal representative of the output from the module.

Another object is to provide a novel and improved type of dew point hygrometer instrument for measuring the temperature at which dew appears.

Still another object is to improve the circuitry for supplying D.C. power to a load from an alternating current (A.C.) source, using a rectifier bridge and a controllable impedance across the bridge for varying the current through and the voltage across a transformer supplying power to the load.

A further object is to provide a method of controlling a device responsive to voltages of opposite relative polarities simultaneously supplied thereto in bucking relation which comprises inversely varying the magnitudes of said voltages as a function of a varying control signal.

A feature of the invention is the circuit arrangement which makes use of two transformers having primary windings serially connected for supplying alternating current to separate A.C. to D.C. converters which, in turn, are poled to supply opposing (bucking) direct currents to the load, such as a thermoelectric module. A full wave rectifier bridge is connected from a point between the primary windings of the two transformers to the other side of the alternating current supply. In shunt to one of the diagonals of the bridge rectifier there is an electronic device such as a semiconductor device or a suitable grid-controlled thyratron to which variable control signals are applied in order to vary the relative magnitudes of the energy supplied to the two primary windings. In this way, when the power supplied to one of the two primary windings increases, the power supplied to the other primary winding decreases, and vice versa.

A more detailed description of the invention follows, in conjunction with a drawing the single figure of which illustrates an embodiment of the invention.

Although the invention is described hereinafter with especial reference to its use for measuring the dew point temperature, it should be understood that the invention is not limited to this specific application and that the control circuit has much broader application and can be used to respond to a signal representative of any variable where the change can be translated into two opposing or bucking D.C. voltages of suitable relative magnitudes for operating a transducer.

The single figure of the invention shows the novel proportional control circuit as used in a dew point hygrometer in which there is provided a thermoelectric module.

The principles underlying the thermoelectric effect as generally applied to thermoelectric modules are well known in the art and no claim is being made herein to such a module per se. Thermoelectric components or circuit members are made of bodies of thermoelectric materials such as bismuth telluride, lead telluride, germanium telluride, antimony telluride, silver gallium telluride, and the like. Similar compounds of selenide, and of sulfur, for example the rare earth sulfides, also exhibit thermoelectric effects. While the pure compounds may be utilized, thermoelectric compositions usually consist of alloys or solid solutions of more than one compound. Small amounts of various additives or doping agents may be incorporated in the thermoelectric composition to modify the conductivity type of the material.

Thermoelectric devices which may convert heat energy directly into electrical energy by means of the Seebeck effect, or utilize electrical energy for environmental cooling by means of the Peltier effect, as in the embodiment hereinafter described, generally comprise two thermoelectric bodies bonded to a block of metal, which may, for example, be copper to form a thermoelectric junction. The thermoelectric bodies which compose a thermoelectric device or module are known as thermoelements, and are sometimes referred to as thermoelectric components or thermoelectric circuit members. The two thermoelectric bodies are of thermoelectrically complementary (dissimilar) types, that is, one thermoelement is made of P-type thermoelectric material and the other of N-type thermoelectric material.

The thermoelectric dew point hygrometer instrument shown in the drawing comprises a circuit for proportionally controlling the magnitude and direction of direct current (D.C.) through a thermoelectric module TE. This module comprises two dissimilar semiconductive thermoelectric elements P and N (identifying P-type and N-type materials) joined together at one end by a central block of copper C which is highly conductive both electrically and thermally. Block C also acts as a spacer. When direct current is applied to the respective ends of the module TE in one direction the copper block C will be a cold or condensing junction capable of depositing dew upon a dew plate or mirror 10. On the other hand, when direct current is applied to the respective ends of the module TE in the opposite direction the copper block C will heat up and become a heated junction. This phenomenon is a manifestation of the Peltier effect. The dew plate 10 is highly polished to provide a light reflecting mirror for light rays impinging thereon and in its preferred form constitutes the upper surface of copper block C so as to be in intimate contact and at the same temperature therewith without thermal lag. For measuring the temperature of the dew plate 10 there may be provided a bulb thermometer whose bulb is positioned within a hole or bore in the block C adjacent the mirror surface 10, or, as illustrated, a thermocouple, or other transducer 12 connected to the block C adjacent the mirrored plate 10 to actuate a dew point visual indicating meter M through wires 14. In close proximity with the mirror plate 10 there is provided a comparison mirror plate 16 the surface of which may form part of a metallic block adjacent to but physically spaced by an air space from the metallic block C constituting the polished mirror surface 10. The thermoelectric module with its comparison mirror plate 16 may be constructed in the manner disclosed in our co-pending application, Serial Number 279,369 filed May 10, 1963, now United States Patent No. 3,142,986, wherein the semiconductor thermoelectric elements P, N and the copper junction block C are all rectangular in cross-section and positioned end-to-end, with the block C between and having the same cross-sectional area as the elements P and N. In our co-pending application, the metallic block containing the highly polished light reflecting comparison mirror surface 16 may be substantially identical to block C except that it need not have a bore or hole for accommodating the bulb of a thermometer, or a thermocouple. Because the comparison mirror plate 16 is external of the thermoelectric path between the thermoelements P and N, it does not form a part of the thermoelectric junctions of the module. The arrangement is such that thermal lag is reduced to a minimum, thereby improving the response characteristic to rapidly changing conditions of humidity.

For supplying current to the thermoelectric module TE there are provided electric power mains 18 which are connected to the alternating house supply by means of an electrical appliance plug 35, transformers T3, T4, T5, and A.C. to D.C. converters 20 and 22. The primary windings of transformers T4 and T3 are connected in electrical series relation. The A.C. to D.C. converters 20 and 22 each include a pair of rectifiers connected back-to-back, across the secondary winding of its associated transformer T5 or T3, respectively, to constitute two power supplies for the thermoelectric module TE, one of which 20 supplies D.C. current to the module TE in a direction to cool the mirror plate or polished surface 10, and the other of which 22 supplies D.C. current to the module TE in a direction to heat the mirror plate or polished surface 10. It should be observed that the two rectifiers in the A.C. to D.C. converter 20 are poled in a direction opposite to the two rectifiers in the A.C. to D.C. converter 22, as a result of which the D.C. voltage outputs from the two converters buck each other, that is to say, they oppose each other. A choke coil 24 in the cooling power supply circuit acts to smooth out most of the ripple in the D.C. output from A.C. to D.C. converter 20. Such a choke is unnecessary in the D.C. output from the heating power supply circuit 22. The magnitude of the voltage from the heating power supply 22 is larger, approximately twice, that of the cooling power supply 20, and, therefore, when they are both in operation, the heating current swamps the cooling current and the mirror 10 will heat up.

The sensor illustrated in the drawing within the dot-dash box 25 comprises a bridge circuit 26 one diagonal of which is connected to the A.C. power mains by way of leads 27 and transformer T1 and the other diagonal of which is connected to one diagonal of a rectifier bridge 28, over leads 29. Bridge 26 comprises four arms two of which are photo-cells P1 and P2 and the others resistors R1 and R2. The other diagonal of the rectifier bridge 28 is coupled to the control circuit for the thermoelectric module TE. This control circuit includes two silicon-controlled rectifiers SCR1 and SCR2 (solid state devices) and a full wave rectifier bridge 30.

A lamp L supplied by A.C. current over transformer T2 in turn connected to the A.C. power mains 18 via transformer T6 is positioned to cast light rays of equal intensity upon the light mirror plates or highly polished light reflecting surfaces 10 and 16. In practice, lamp L will be equally positioned from both light mirrors 10 and 16 and at such an angle with respect thereto and the bridge 26 of the sensor 25 that the light rays reflected from mirror 16 will impinge on photo-cell P1 and the light rays reflected from mirror 10 will impinge on photocell P2. In the particular embodiment illustrated, suitable precautions, such as a baffle, should be taken to prevent light from the lamp L from impinging directly upon the photo-cells. If desired, light tunnels or light baffles may be employed to assure that the light rays reflected from the two mirrors arrive only at their respective photocells, as indicated by the arrows, and do not cross paths to reach an undesired photocell.

The control circuit for the thermoelectric module TE includes a full wave rectifier bridge 30 in circuit with two silicon-controlled (3-element) rectifiers SCR1 and SCR2. Rectifier bridge 30 has one diagonal connected between lead 32 joining the two primary windings of transformers T3 and T4 and lead 34 extending to the power mains 18. The silicon controlled rectifier SCR2 is connected across the other diagonal of rectifier bridge 30 over leads 36. The silicon-controlled rectifier SCR1 is highly sensitive and serves to amplify the signal from the bridge 26 before it is applied to the gate or control electrode of SCR2. In effect, the silicon-controlled rectifier functions as a 3-terminal solid state variable controlled impedance whose impedance varies in dependence upon the magnitude and polarity of a signal supplied thereto.

The control circuit comprising rectifier bridge 30 coupled to the primary windings of transformers T4 and T3 acts to effectively apply a variable short-circuit, so to speak, across the primary winding of the transformer T3 to a degree governed by the signal from the photoelectric bridge 26, and hence effectively and to the same degree affect the heating power supply for the module TE. Actually, the rectifier bridge 30 is a variable impedance which varies the current flowing through and the voltage across the primary windings of transformers T3 and T4, inversely with respect to each other. This is because the current supplied to transformer T3 is at the expense of the current available for transformer T4. Hence, the larger the impedance of rectifier bridge 30, the larger will be the voltage across and the current through the primary winding of transformer T3. The smaller the impedance of rectifier bridge 30, the smaller will be the voltage across and the current through the primary winding of transformer T3. Conversely, the larger the impedance of rectifier bridge 30, the smaller will be the voltage across and the current through the primary winding of transformer T4. The smaller the impedance of the rectifier bridge 30, the larger will be the voltage across and the current through the primary winding of transformer T4. Hence both the heating and cooling supplies for the thermoelectric module TE are simultaneously affected when there is a variation in the impedance of rectifier bridge 30.

In the operation of the system, it is desired to accurately measure the dew point temperature of vapor or gasses condensing on the mirror 10. The resistors R1 and R2 and/or the position of the variable tap V in the photocell bridge 26 are adjusted such that when the circuit is first switched "on" by closing switch SW in the power mains circuit, the silicon controlled rectifier SCR2 is in the conducting state. The conduction of SCR2 causes the full wave rectifier bridge 30 to conduct and hence lowers the impedance of this bridge across the primary windings of the two transformers T3 and T4. A lowering of the impedance of bridge 30 reduces the power supplied to the heating A.C. to D.C. converter 22 and lowers or reduces effectively the heating current supplied to the thermoelectric module TE. Concomitantly, the cooling power supplied to the A.C. to D.C. converter 20 is increased, and the module will cool until dew is deposited on the mirror 10. This deposited dew on the mirror 10 changes the intensity of the light reflected onto the photocell P2 and causes an unbalance of the photocell bridge 26 in such direction as to increase the impedance of the silicon-controlled rectifier SCR2 and hence the impedance of rectifier bridge 30, thus causing more heating current and less cooling current to flow through the thermoelectric module TE until the dew evaporates from the mirror 10, and the whole cycle begins again. This is because the evaporation of the dew on the mirror 10 will increase the intensity of the light rays reflected by the mirror 10 to the photocell P2 and the bridge 26 will again balance. This corrective action is instituted to return the temperature of the module TE to the value at which a slight film of dew appears on the mirror 10. Since the silicon-controlled rectifiers SCR1 and SCR2 are not used as "on-off" switches but as components, the impedances of which vary and are controlled in dependence upon the variations of signals applied thereto, they are proportional to the off-balance of the photocell bridge, and the system is strictly a proportional circuit.

An advantage in using two mirrors in juxtaposition, one (10) for the module TE and the other (16) as a reference or standard, is that if undesired dust particles should deposit on the two mirrors 10 and 16 they will be equally deposited on both mirrors and will equally affect both photocells P1 and P2 and therefore not disturb the accuracy of the system as a whole. Similarly, changes in the intensity of the light source L will not affect the accuracy of the system. Also, changes in the resistance due say to temperature, equally affect both arms and therefore cancel.

If desired, the reference or standard mirror 16 may be dispensed with and the light from lamp L caused to impinge directly upon photocell P1. In such a case, however, the system will lack the advantage mentioned above in regard to the presence of dust on both mirrors not affecting the precision accuracy of the instrument.

In the operation of the system, a continuous range of D.C. currents from 30 amperes cooling to 15 amperes heating can be obtained from the power supplied to the thermoelectric module TE, depending upon the sensor signal from the photocell bridge. The module TE requires more cooling current than heating current to maintain the dew point temperature measurement at equilibrium.

In constructing a hygrometer in accordance with the invention, the following components may be employed.

| | |
|---|---|
| Transformer T6 | Sola 20–14–015 constant voltage transformer. |
| D1, 2, 3, 4 | Raytheon 1N676 diodes. |
| D5, 6, 7, 8 | RCA 1N442B rectifiers. |
| R1 | 500 ohms resistor—ohmite 2W. |
| R2 | 1000 ohms resistor—ohmite 2W. |
| R3 | 6200 ohms resistor—ohmite 2W. |
| A | Ammeter 30–0–30 ammeter. Shurite 8215Z. |
| R5 | Tru-ohm 100W—100 ohm resistor. |
| SCR1 | G.E. C5B. |
| SCR2 | G.E. C11B. |
| F1 | Little fuse. |
| T1 | Stancor P6375 transformer. |
| T2 | Stancor P4026 transformer. |
| T3 | Stancor P6135 transformer. |
| T4 | UTC R42 transformer. |
| D9, 10 | I.R. 1N2128A rectifiers. |
| R4 | Ohmite 2W—3300 ohms resistor. |

It should be understood that the invention is not limited to the particular type of sensor 25 illustrated and described, and that for other applications of the control circuit of the invention, the sensor may be any suitable type of A.C. or D.C. bridge such as one controlled by any variable, for example, a conductivity cell, a capacitance or an inductance, or the sensor may be a temperature responsive device which provides an output corrective signal to the control circuit which is a function of and varies in accordance with a variation of temperature from a desired value or norm, in which case the module TE need not use the mirrors but may be used to provide heating or cooling current to an oven, such as a crystal controlled oven. Other possible uses of the invention are; for example, to control speed and direction of a D.C. motor, i.e. a servo, with reference to a given sensor output.

The thermoelectric module TE may be enclosed within a chamber, not shown, through which a stream of gas or vapor passes, on which dew point determination is to be made, in which case the mirror surface 10 will be on the outside of the chamber in close proximity to the copper block C and responsive to the temperature thereof. The other mirror 16 will also be on the outside of the chamber very close to the mirror 10.

What is claimed is:

1. A proportional control system comprising a source of alternating current, a thermoelectric heater-cooler device whose heating and cooling properties are to be controlled and which is responsive to a difference in the magnitudes and polarities of the outputs from a pair of D.C. power supplies, said D.C. power supplies comprising individual A.C. to D.C. converters coupled to said source of alternating current through individual transformers, means enabling said two converters to simultaneously supply D.C. voltages of opposite polarities to said device, a control circuit responsive to a variable signal for inversely changing the relative amounts of power supplied to said transformers as a function of said variable signal, and a sensor responsive to the deviation of a signal from a desired norm for supplying said variable signal to said control circuit.

2. A proportional control system comprising a source of alternating current, a device to be controlled and which is responsive to a difference in the magnitudes and polarities of the outputs from a pair of D.C. power supplies, said D.C. power supplies comprising individual A.C. to D.C. converters coupled to said source of alternating current through individual transformers, means enabling said two converters to simultaneously supply D.C. voltages of opposite polarities to said device, a control circuit responsive to a variable signal for inversely changing the relative amounts of power supplied to said transformers as a function of said variable signal, and a sensor responsive to the deviation of a signal from a desired norm for supplying said variable signal to said control circuit, said control circuit including a rectifier bridge across one diagonal of which there is coupled a silicon-controlled rectifier coupled to and responsive to a signal from said sensor.

3. A proportional control system comprising a sensor responsive to a deviation in signal from a desired norm for providing an output signal which is proportional to the amount and direction of said deviation, a device to be controlled which is responsive to a difference in the magnitudes and polarities of the outputs from a pair of D.C. power supplies, means coupling said pair of D.C. power supplies simultaneously to said device for supplying bucking voltages thereto, a pair of connections supplying energy to said pair of D.C. power supplies in electrically series relation, a control circuit comprising a full wave rectifier bridge having one diagonal coupled across said pair of connections from a point between said series connected power supplies, and a three-terminal controllable electronic device coupled to the other diagonal of said rectifier bridge for varying the impedance of said bridge in accordance with the value of a control signal applied to said electronic device, and connections for supplying the output signal from said sensor to said electronic device.

4. A proportional control system in accordance with claim 3, wherein said three-terminal electronic device is a gate-controlled solid state silicon controlled rectifier, and a sensitive silicon controlled rectifier amplifier coupled between said first silicon controlled rectifier and said sensor.

5. A proportional control system comprising a device to be controlled which is responsive to a difference in the magnitudes and polarities of the outputs from a pair of D.C. power supplies, a two-terminal source of alternating current, a pair of individual transformers, means connecting the primary windings of said pair of transformers in series to the terminals of said source of alternating current, separate A.C. to D.C. converters between said transformers and said device to be controlled, said converters being so poled and arranged so as to supply voltages of opposite relative polarities simultaneously to said device, and a control circuit coupled across said terminals from a point between the serially-connected primary windings of said pair of transformers, said control circuit comprising an impedance which is variable in response to a signal applied thereto, a first silicon controlled rectifier coupled to said impedance for varying the same in response to a control signal, an amplifier in the form of a second silicon controlled rectifier coupled to said first silicon controlled rectifier for controlling the conductivity thereof, and a sensor responsive to a signal which deviates from a desired norm for supplying a control signal to said amplifier.

6. A proportional control circuit in accordance with claim 5, wherein said device to be controlled is a thermoelectric module to which voltages of opposite relative polarities are simultaneously supplied by said A.C. to D.C. converters, a choke to smooth out the ripples supplied from one of said converters, said variable impedance comprising a rectifier bridge one diagonal of which is connected across the first silicon controlled rectifier.

7. A dew point hygrometer comprising a thermoelectric module having a pair of dissimilar thermoelectric elements joined together by a highly thermally and electrically conductive metallic body, said body having in proximity thereto a polished light reflecting mirror the temperature of which varies in accordance with the temperature of said body, another metallic conductor body having a reference mirror surface physically spaced from but adjacent to said first conductive body but external to the electrical path between said thermoelectric elements, a source of light, a sensor in the form of a bridge having two photocells in two of its arms, said source of light and said mirrors and said bridge being disposed to enable light rays from said source of light to impinge upon said two mirrors and to be separately reflected so as to respectively strike said photocells, means for detecting the temperature of said mirror which is in intimate association with said module, a source of alternating current, a pair of transformers having their primary windings electrically in series with said source of alternating current, separate A.C. to D.C. converters between the secondary windings of said transformers and the thermoelements of said module, said converters being so poled as to simultaneously supply voltages of opposite relative polarities to the thermoelectric elements of said module, whereby both heating and cooling currents are fed to said module simultaneously, a control circuit in the form of a rectifier bridge having one diagonal coupled across said source of alternating current from a point between the serially connected primary windings of said transformers, a first silicon-controlled rectifier coupled across the other diagonal of said bridge, a second silicon-controlled rectifier serving as a signal amplifier coupled to said first silicon-controlled rectifier, and a rectifying bridge coupled to the output of said photocell bridge for supplying a signal therefrom to said signal amplifier for varying the impedance to said control circuit in accordance with variations in the output signal from said sensor.

8. A dew point hygrometer comprising first and second mirrors physically spaced from each other, a light source, first and second photocells in opposite branches of a bridge circuit, said light source being arranged to direct light towards said photocells by reflection from said two mirrors and in such manner that the amount of light falling on one of said photocells when said first mirror is wet differs from that when said first mirror is dry, a thermoelectric module in close association with said first mirror, means applying voltages of opposite polarities to said module simultaneously, whereby both heating and cooling currents tend to flow through the thermoelements of said module, and a control circuit responsive to the output of said bridge for inversely varying the magnitudes of said voltages to control the temperature of said first mirror.

9. A dew point hygrometer according to claim 8 wherein the magnitude of the voltage which supplies said heating current is appreciably larger than that which supplies said cooling current.

References Cited by the Examiner
UNITED STATES PATENTS

| | | | |
|---|---|---|---|
| 2,888,622 | 5/1959 | Mooers | 318—257 |
| 2,973,468 | 2/1961 | Claflin et al. | 318—257 |
| 2,977,521 | 3/1961 | Macgeorge | 318—257 |
| 3,119,957 | 1/1964 | Alexanderson | 318—257 |
| 3,173,289 | 3/1965 | Davis | 73—17 |
| 3,195,344 | 7/1965 | Francisco | 73—17 |
| 3,195,345 | 7/1965 | Thiele | 73—17 |

FOREIGN PATENTS 911,796  11/1962  Great Britain.

RICHARD C. QUEISSER, *Primary Examiner.*

J. C. GOLDSTEIN, *Assistant Examiner.*